(12) United States Patent
Johnson et al.

(10) Patent No.: US 10,014,934 B2
(45) Date of Patent: Jul. 3, 2018

(54) APPARATUS AND METHOD FOR PROVIDING EAVESDROPPING DETECTION OF AN OPTICAL FIBER COMMUNICATION

(71) Applicant: id Quantique SA, Carouge (CH)

(72) Inventors: Simon Johnson, Chêne-Bougeries (CH); Grégoire Ribordy, Troinex (CH)

(73) Assignee: id Quantique SA, Carouge (CH)

( * ) Notice: Subject to any disclaimer, the term of this patent is extended or adjusted under 35 U.S.C. 154(b) by 0 days.

(21) Appl. No.: 15/152,420

(22) Filed: May 11, 2016

(65) Prior Publication Data

US 2016/0337032 A1 Nov. 17, 2016

(30) Foreign Application Priority Data

May 12, 2015 (EP) .................................... 15167392

(51) Int. Cl.
| | |
|---|---|
| *H04B 10/25* | (2013.01) |
| *H04B 10/07* | (2013.01) |
| *G09C 1/00* | (2006.01) |
| *H04L 9/08* | (2006.01) |
| *H04B 10/70* | (2013.01) |
| *H04J 14/02* | (2006.01) |

(Continued)

(52) U.S. Cl.
CPC ............ *H04B 10/0705* (2013.01); *G09C 1/00* (2013.01); *H04B 10/70* (2013.01); *H04J 14/02* (2013.01); *H04J 14/06* (2013.01); *H04J 14/08* (2013.01); *H04L 9/0852* (2013.01); *H04L 63/061* (2013.01); *H04Q 11/0067* (2013.01); *H04Q 2011/0083* (2013.01); *H04Q 2213/1301* (2013.01)

(58) Field of Classification Search
CPC ... H04L 9/0852; H04L 9/0858; H04L 9/0855; H04L 63/061; H04B 10/70; H04B 10/0705
USPC .......................................................... 398/16
See application file for complete search history.

(56) References Cited

U.S. PATENT DOCUMENTS

| | | |
|---|---|---|
| 4,741,585 A | 5/1988 | Uken |
| 5,307,410 A | 4/1994 | Bennett |

(Continued)

FOREIGN PATENT DOCUMENTS

| | | |
|---|---|---|
| WO | 2006119608 A1 | 11/2006 |
| WO | 2012089711 A1 | 7/2012 |

*Primary Examiner* — Don N Vo
(74) *Attorney, Agent, or Firm* — Johnson, Marcou & Isaacs, LLC

(57) ABSTRACT

A method for providing eavesdropping detection of an optic fiber communication between two users includes the steps of exchanging both data and probe signals through at least two channels (400, 500) between the users, exchanging probe signals (143) on one channel (500 or 400) between quantum probe signal terminals, extracting a key for authentication from the probe signals, and exchanging data signals (142) between transmission units on another channel (400 or 500). A first portion of the key generated by the quantum probe signal terminals is used to authenticate the terminals, wherein a second portion of the key is dedicated to define commutation occurrences of commutation devices adapted to commutate the use of the channels (400, 500) for data (142) and probe (143) signals, thus detecting an eavesdropping event (300) which triggers an alarm (750). A further portion of the key can be used to encrypt the messages.

13 Claims, 7 Drawing Sheets

(51) Int. Cl.
    *H04J 14/06*     (2006.01)
    *H04J 14/08*     (2006.01)
    *H04L 29/06*     (2006.01)
    *H04Q 11/00*     (2006.01)

(56) References Cited

U.S. PATENT DOCUMENTS

| | | |
|---|---|---|
| 5,953,421 A | 9/1999 | Townsend |
| 7,068,790 B1 | 6/2006 | Elliott |
| 2005/0135612 A1* | 6/2005 | Evans ............... H04K 1/10 380/43 |
| 2008/0175385 A1 | 7/2008 | Lee et al. |
| 2010/0257434 A1* | 10/2010 | Harrison ............ H03M 13/11 714/785 |
| 2010/0329459 A1* | 12/2010 | Wiseman ............ H04B 10/70 380/256 |
| 2012/0195428 A1* | 8/2012 | Wellbrock ........... H04L 9/0855 380/255 |

* cited by examiner

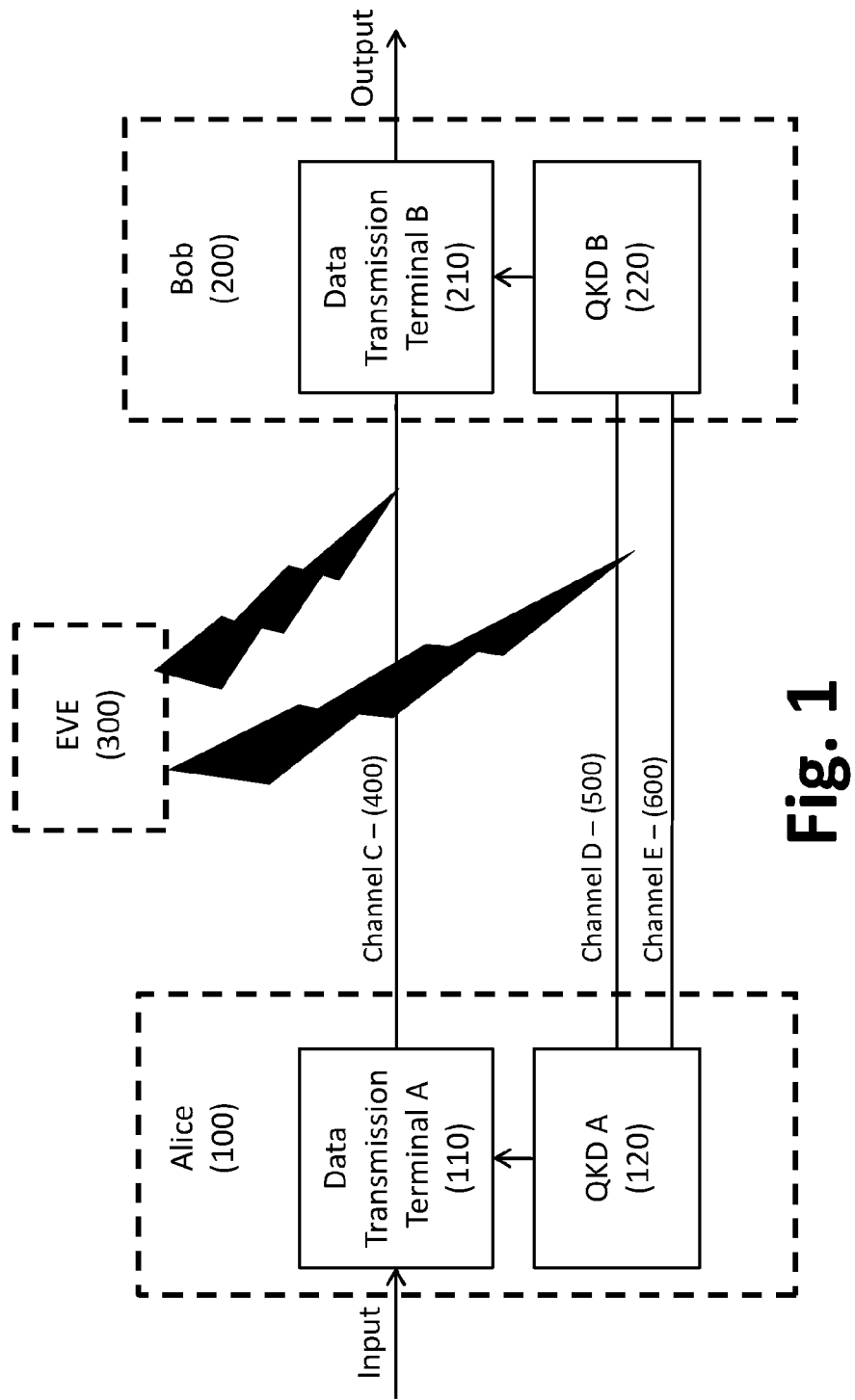

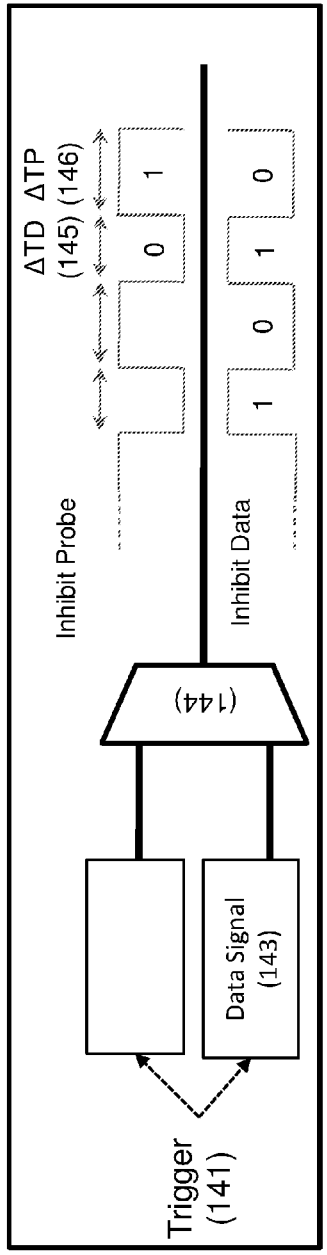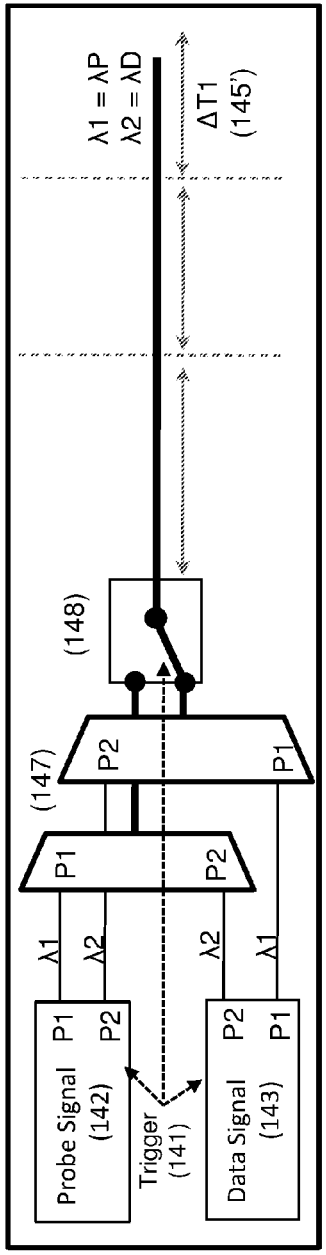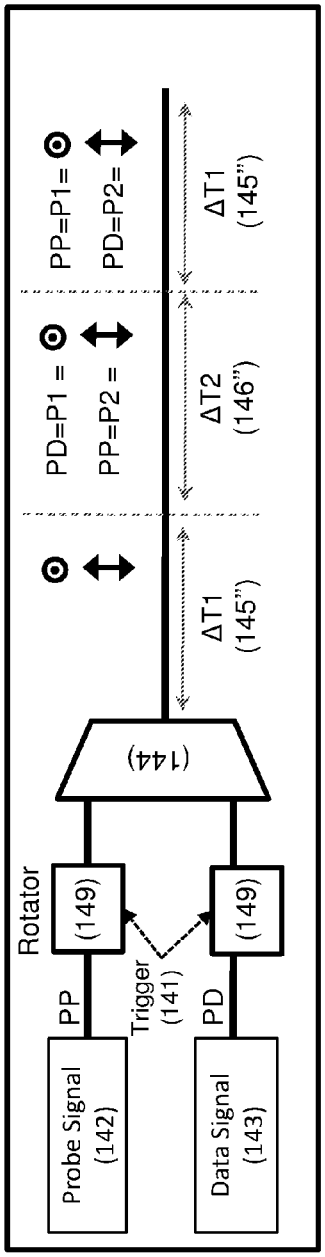

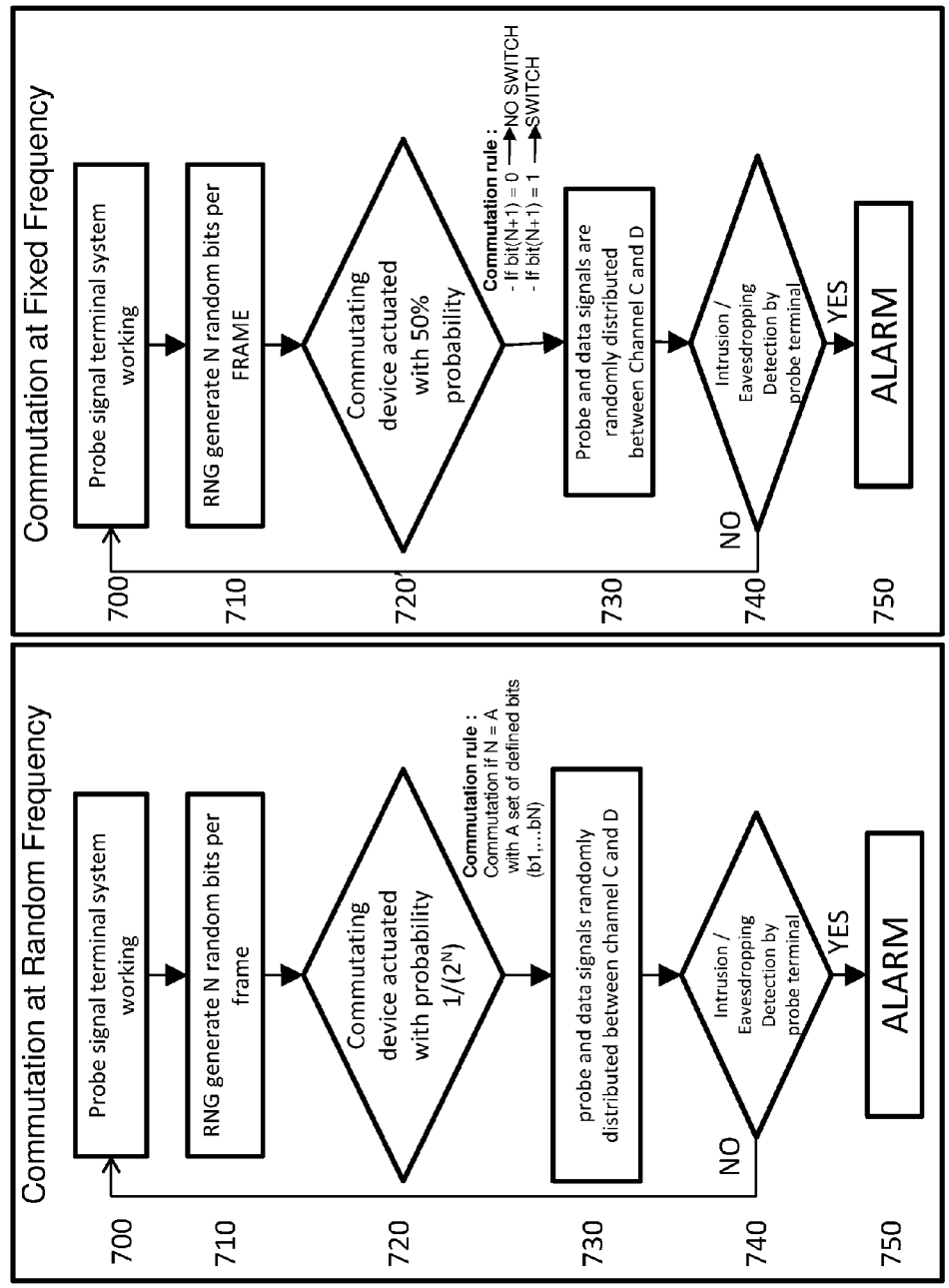

APPARATUS AND METHOD FOR PROVIDING EAVESDROPPING DETECTION OF AN OPTICAL FIBER COMMUNICATION

CROSS-REFERENCE TO RELATED APPLICATIONS

The instant application claims the priority date of May 12, 2015, the filing date of the European patent application EP 15 167 392.8.

BACKGROUND OF THE INVENTION

The present invention relates to an apparatus for providing eavesdropping detection of an optical fiber communication and a method related thereto.

Several means to eavesdrop optical fibers have been developed in last decades.

This work leads to many techniques to tap optical signals in order to extract information from optical fibers (using for example reflectors such as in U.S. Pat. No. 4,741,585). In order to overcome these means, encryption is usually used to prevent an eavesdropper from understanding extracted information. Even though encryption is usually used, tapped encrypted data may be deciphered thanks to several software or hardware means. Therefore, in some applications it is important to detect interception attempts. This is currently achieved by attenuation monitoring, but it has several limitations. As it is based on a reference signal that cannot detect pre-existing interception devices, aging of components may require resetting of bounds and system can generate some false positive results.

As an example and illustration, Optema, Sterling, Va. 20166, proposes a Fiber Sentinel System as a commercial application based on attenuation and optical anomalies (tapping or injection) detection for optical data signals.

Additional solutions for protection against eavesdropping involve Quantum Cryptography. The primary goal of Quantum Cryptography or Quantum Key Distribution (QKD) is to be able to share between an emitter and a receiver a sequence of bits whose privacy can be proven with a limited set of assumptions. The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). QKD (quantum key distribution) involves establishing a key between a sender ("Alice") and a receiver ("Bob") by using quantum states carried by either single-photons or weak (e.g., 0.1 photon on average) optical signals (pulses). Those quantum states are called "qubits" or "quantum signals", and are transmitted over a "quantum channel". Unlike classical cryptography whose security depends on computational impracticality, the security of quantum cryptography is based on the quantum mechanics principle that measurements of a quantum system will modify its state. Consequently, an eavesdropper ("Eve") that attempts to intercept or otherwise measure the exchanged qubits introduces errors in this list of exchanged qubits that reveal her presence.

Specific QKD systems are described in U.S. Pat. No. 5,307,410 to Bennett (which patent is incorporated herein by reference), and in the article by C. H. Bennett entitled "Quantum Cryptography Using Any Two Non-Orthogonal States" (Phys. Rev. Lett. 68 3121 (1992)). A survey of the bases and methods as well as the historical development of quantum cryptography is contained in the articles by N. Gisin, G. Ribordy, W. Tittel and H. Zbinden, "Quantum Cryptography" (Reviews of Modern Physics. 74, 145 (2002)). In a QKD implementation, the emitter and the receiver are linked by a Quantum Channel (QC), which is a channel over which the qubits are exchanged and a Service Channel (SC) used for all kinds of classical communications between the emitter and the receiver. Part of these classical communications consists in the post-processing of the sequence of qubits exchanged over the QC.

A typical and well known deployment (presented in FIG. 1) involves a pair of QKD devices connected by a Quantum Channel (QC) and Service Channel (SC), as well as at least one pair of encryption devices connected through a second Data Channel (DC) used for data exchange (this data may be encrypted or not). FIG. 1 is a schematic diagram of a prior art communication system with QKD systems based on those disclosed in U.S. Pat. No. 5,307,410 to Bennett and U.S. Pat. No. 5,953,421 to Townsend, both of which are incorporated herein by reference. QKD system includes two QKD stations, 120 and 220, in the emitter Alice 100 and the receiver Bob 200 respectively, and two Data Transmission Terminals, 110 and 210. The simplest form of a system for providing encrypted communication between two different sites is to perform as follows:

Data Transmission Terminal A 110 and B 210 are linked through DC, and

QKD station at emitter Alice 120 and QKD station at Bob 220 are linked one to the other through two channels (e.g. two optical fibers), a Service Channel SC D 500 and Quantum Channel QC E 600.

An important and unique property of quantum key distribution is its ability to reveal the presence of any third party trying to gain knowledge on the key. This results from a fundamental aspect of quantum mechanics: the process of measuring a quantum system in general disturbs the system. Therefore, a third party trying to eavesdrop on the key must in some way measure it, thus introducing detectable anomalies. By using, for example quantum superpositions or quantum entanglement and transmitting information in quantum states, a communication system can be implemented which detects eavesdropping (QKD). If the level of eavesdropping is below a certain threshold, a key can be produced that is guaranteed to be secure (i.e. the eavesdropper has no information about it), otherwise no secure key is possible. Therefore, presence of any eavesdropper 300 intercepting the transmitted key results in a change in the statistics of the received data.

As presented in FIG. 1, a simple embodiment is to use a dedicated optical fiber for each channel (CC, QC and DC) but other possibilities exist. The required separation of the quantum signal from data signal may be provided through: (1) use of two distinguished channels; (2) a reserved wavelength for each signal; or (3) a well defined timing dedicated to a specific signal on the same channel. In the context of the present invention, a "channel" relates to a separated transmission of the quantum signal from the data signal. It does not necessarily mean the presence of two fibers; it may well be one fiber used with light at two different wavelengths or at different polarizations or time-divisions.

Therefore, the set of techniques related to option (2) is commonly called Wavelength Division Multiplexing. In this case a wavelength window is dedicated to the quantum signal and a distinguished wavelength window is for the communication signal. WDM enables signals of multiple wavelengths to be concurrently transmitted over a given optical medium. Several implementation alternatives have been disclosed where quantum channel is isolated by means of wavelength-sensitive passive optical components such as WDM couplers and filters in Townsend, P. D., "Quantum cryptography on optical fiber networks" (SPIE Conference on Photonic Quantum Computing II, SPIE vol. 3385, (Orlando, Fla.). (April, 1998), 12 pp.) and Townsend, P. D., "Simultaneous quantum cryptographic key distribution and conventional data transmission over installed fibre using transmission over installed fibre using wavelength-division multiplexing" (Electronics Letters, 33(3), (1997), 2 pp.)

Alternatively, it is possible using option (3) to operate the quantum and data channels at the same wavelength and achieve isolation by means of polarization- or time-division multiplexing. Time Division Multiplexing, already known in QKD, referring to Mo & al., 2011, is characterized by the use of quantum frames, which consists of alternating sequences of high-intensity laser pulses (forming classical frames for data communications) and faint laser pulses (encoding quantum data).

In summary, to perform QKD and encrypted data exchange, one must implement two parties, one emitter Alice 100 with one Data transmission terminal 110, and a QKD terminal 120 and one receiver Bob 200 with one Data transmission terminal 210 and a QKD terminal used for quantum data 220, that are linked for communication, by at least three channels 400, 500, 600. One Quantum Channel 600 allows them to exchange the quantum data and one Data Channel 400 allows them to communicate together. The last channel SC 500 is used for terminal synchronization and post-processing functionalities. Further developments include as an example U.S. Pat. No. 5,953,421 where signals corresponding to different encoded states are detected independently in two branches and the rate of detection of coincident signals is determined. This rate is compared with a threshold to detect the presence of an eavesdropper.

An improved method is described in U.S. Pat. No. 7,068,790 where the system as used establishes a path for distributing data through an optical network, including an optical switch establishing a first and a second encryption key distribution path through the optical network. Both encryption key distribution paths include multiple optical switches and optical links. A data distribution endpoint determines whether eavesdropping has occurred on, e.g., the first encryption key distribution path using quantum cryptography. The optical switch establishes said second data distribution path through the optical network responsive to the eavesdropping determination.

Furthermore US 2008/0175385 provides a QKD system having QKD link redundancy between two sites, wherein the system has only one QKD station at each site. Several, e.g. two, QKD links are operably coupled to the QKD stations. The QKD stations have respective optical switches that are optically coupled to both QKD links and that are controlled by respective controllers in each of the QKD stations. If one of the QKD links fails or has trouble transmitting optical signals, the QKD switches are switched so that the optical path between the QKD stations uses the remaining QKD link. This arrangement requires allegedly only two QKD stations rather than the four QKD stations as previously known from the prior art.

Moreover, some experimental demonstration of Quantum Communication and QKD beyond point-to-point optical links toward a dynamically reconfigured optical network including optical-layer multiplexing, switching and routing has been demonstrated in T. E. Chapuran et al ("Optical networking for quantum key distribution and quantum communications", New J. Phys. 11 105001, 2009). The use of an optical switch has also been applied to prevent QKD systems from denial of service. U.S. Pat. No. 7,068,790 and US Patent No. 2008/0175385 disclose QKD systems with a switch used to provide redundancy. Switches are exploited to provide several alternative paths for quantum communications, which ensures QKD working even in case of fiber disruption.

In the following description, "channel" should be understood in a generic sense: a physical medium which can transmit a modulation of some physical property. This modulation can be used to transmit data. The specification describes in detail the apparatus and method used, whereby direct reference is made to the following non-patent literature documents, inter alia, to define wordings and terminology of this specific field of technology.

Further non-patent literature includes:

C. H. Bennett, 1992, "Quantum Cryptography Using Any Two Non-Orthogonal States", Phys. Rev. Lett. 68 3121;

T E Chapuran et al, 2009, "Optical networking for quantum key distribution and quantum communications", New J. Phys. 11 105001;

N. Gisin, G. Ribordy, W. Tittel and H. Zbinden, 2002, "Quantum Cryptography", Reviews of Modern Physics. 74, 145.

P. D., Townsend, 1998, "Quantum cryptography on optical fiber networks", SPIE Conference on Photonic Quantum Computing II, SPIE vol. 3385, (Orlando, Fla.). (April 1998), 12 pp;

P. D., Townsend, 1997, "Simultaneous quantum cryptographic key distribution and conventional data transmission over installed fibre using transmission over installed fibre using wavelength-division multiplexing", Electronics Letters, 33(3), 2 pp; and X. F. Mo, I. Lucio-Martinez, P. Chan, C. Healey, S. Hosier, W. Tittel, 2011, "Time-cost analysis of a quantum key distribution system clocked at 100 MHz", arXiv: 1105.3761v1, 18 May 2011.

SUMMARY OF THE INVENTION

Therefore, with current techniques, eavesdropping detection is only possible on QC and not on SC or on DC running in parallel to QKD. In some applications, it is valuable for users to be able to detect eavesdropping attempt on a SC or DC used to transmit sensitive data in a way that cannot be predicted or influenced by said eavesdropper. It is therefore one object of the invention to overcome this issue existing in QKD traditional implementations.

Based on this prior art, it is an object of the present invention to provide to communication users the possibility to detect the presence of any eavesdropper on any physical channel between an emitter A and a receiver B.

The general idea of the invention is to connect the emitter and receiver with at least two channels, via a system that is capable to generate two types of signals: a quantum probe signal and a data signal. In order to achieve this, one must be able to send quantum probe signals alternatively on several channels and get the messages synchronized between the emitter and receiver. This invention resolves this issue by disclosing an apparatus distributing randomly and alternatively data signals and quantum probe signals on multiple channels in a way that cannot be predicted by an eavesdropper. Moreover, a controlling unit is used in order to synchronize data and quantum probe signals distribution. If eavesdropping is detected, at least one of the several actions may be performed by the system: an alarm notifies the end-user of the intrusion, data signals on SC and DC are interrupted, and alternatively the signal traffic is rerouted.

The above objects of invention are achieved with a method for providing eavesdropping detection of an optic fiber communication between two users. The method includes the steps of exchanging both data and probe signals through at least two channels between the users, exchanging probe signals on one channel between quantum key distribution units, extracting a key for authentication from the probe signals, and exchanging data signals between transmission units on another channel using the extracted key. Here, only a portion of the key generated by the quantum key distribution units is used to authenticate messages within the data signals and/or to encrypt said messages, wherein a further portion of the key is dedicated to define switch occurrences of commuting devices adapted to switch the use of the channels for data and probe signals, thus detecting an eavesdropping event which can be used to trigger an alarm.

Such a method for providing eavesdropping detection of an optic fiber communication between two users comprises the steps of exchanging both data and quantum probe signals between the users, exchanging quantum probe signals on one channel between Quantum probe signals terminals, extracting a key for authentication of the communications used for the key distillation process, and exchanging data signals between transmission units on another channel using the extracted key. Here, only a portion of the key generated by the quantum key distribution units is used to authenticate messages within the data signals and/or to encrypt said messages. A further portion of the key is dedicated to define a random switch frequency of commutating devices configured to commutate the use of the channels for data and quantum probe signals.

According to a particular embodiment of the invention the method is further characterized in that the controlling unit is a Random Number Generator device implemented in order to modify randomly the status of any fiber link as a communication channel or quantum probe signal channel. In the above embodiments, it may further be provided that synchronization is established for the two transmission channels using randomness expansion process based on Random Number Generators. In that case, commutation frequency synchronization may be extracted from a set of bits generated by QKD engines. To achieve this, the commutating channel device on receiver and emitter are synchronized thanks to a set of the key generated by QKD system. Actually using the same seed provided by QKD systems generates same bits results at RNG output; RNG are therefore synchronized because of this method.

One of the main benefits of the disclosed invention is the eavesdropper detection on any channel between QKD emitter and receiver. As the quantum probe signal and data signal are commuted at a defined or random frequency on several channels, an eavesdropper cannot anticipate and differentiate "a priori" Quantum Channel from Data Channel. Therefore, any eavesdropping attempt may be detected on any link.

A system for providing eavesdropping detection of an optic fiber communication between two users comprises quantum key distribution units provided with each user for exchanging probe signals on a channel, wherein the quantum probe signal terminals are configured to extract a key for authentication from the probe signals. Transmission units for exchanging data signals on another channel are provided, wherein the quantum probe signal terminals are configured to use a first portion of the key generated by the quantum probe signal terminals to authenticate the transmission units and to dedicate a second portion of the key to define commutation occurrences of commutating devices configured adapted to commutate the use of the channels for data and probe signals.

The use of commutation occurrences can be described to have a commutation frequency, since there are regularly or irregularly timed commutation events.

The commutating devices can distribute and combine probe and data with wavelength, time or polarization multiplexing techniques.

The transmission units can be configured to use another portion of the extracted key to encrypt and decrypt the messages within the data signals.

The controlling unit can comprise a random number generator and a quantum probe signal terminal.

The quantum probe signal terminals can be are quantum key distribution units.

The commutating devices can be optical switches.

A computer program can be provided comprising computer program code that, when carried out in a digital control circuit of an apparatus, system or device, as mentioned above, causes the digital control circuit to carry out a method for providing eavesdropping detection of an optic fiber communication between two users with the above mentioned steps.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 describes prior art related to QKD systems based on parallel Data, Service ad Quantum channels;

FIG. 4a shows signal handling of the apparatus of the commutating device based on Time Division Multiplexing principle;

FIG. 4b shows signal handling of the apparatus of the commutating device based on Wavelength Division Multiplexing principle;

FIG. 4c shows signal handling of the apparatus of the commutating device based on polarization rotation principle;

FIG. 5a shows a flowchart of a method enabling to commute data and quantum probe signals at random frequency;

FIG. 5b shows a flowchart of a method enabling to commute data and quantum probe signals at fixed frequency.

DETAILED DESCRIPTION OF PREFERRED EMBODIMENTS

FIG. 1, as mentioned and described above, relates to prior art where QKD systems are based on parallel Data and Quantum channels.

Figure 2A:
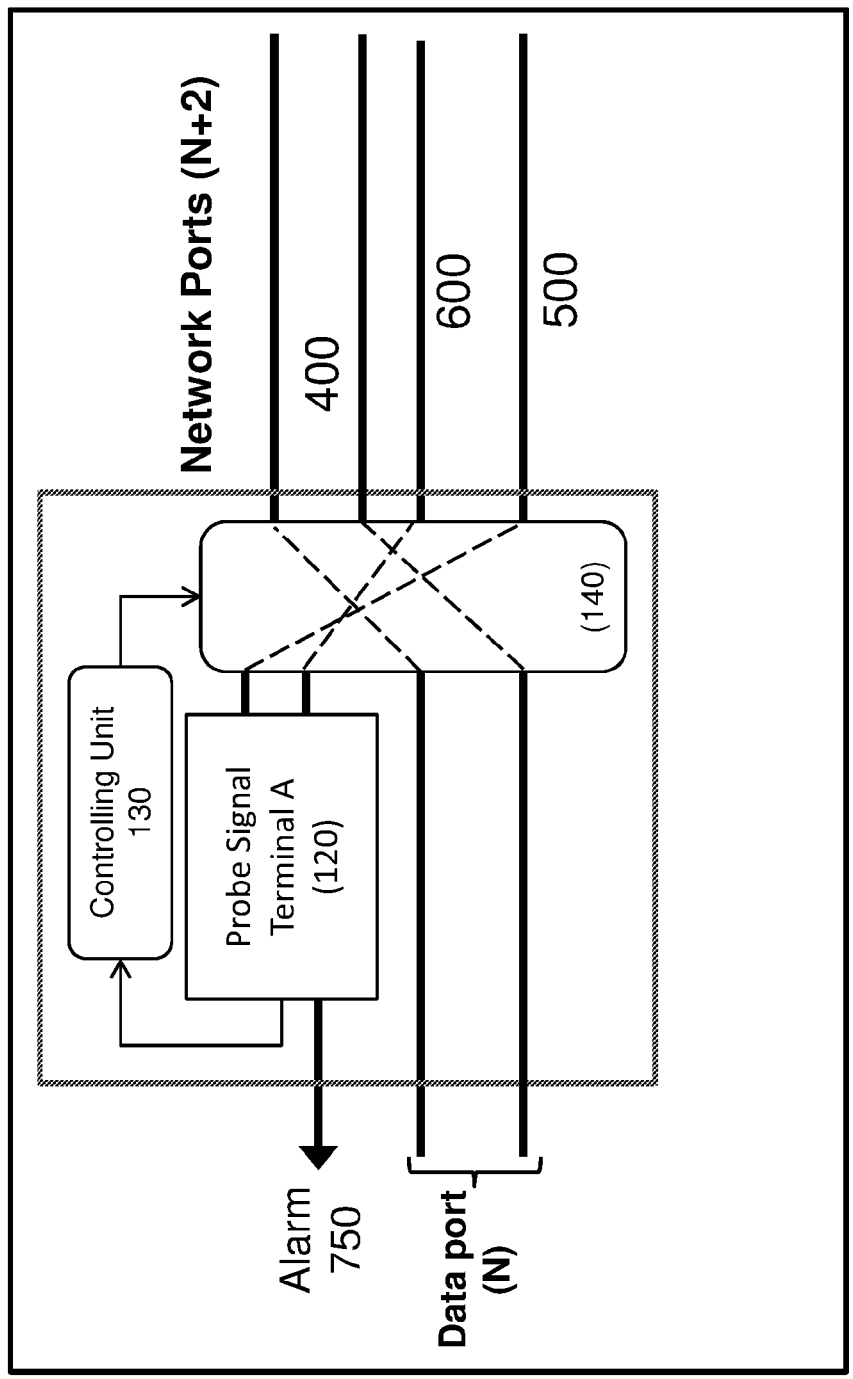
FIG. 2a is a schematic view of the general architecture of the apparatus of the invention at sub-system level.

FIG. 2a is a simplified representation of the general apparatus of the invention. It is composed of a Quantum probe signal Terminal A 120, a controlling unit 130 and commutating device 140. Commutating device is connected to Data Transmission Terminal A 110 through N data channels carrying data signals. The data signal transmission terminal 110 also includes an input/output port to receive or send data from/to other data transmission equipment. Commutating device 140 input is connected to N Data Transmission Terminal 110 through N ports carrying data signals and two communication channels for the quantum probe signal 120. Commutating device 140 will have at least N+2 outputs. The controlling unit 140 will control the commutating device so that from time to time it changes to which physical channel the data signal and the quantum probe signal are directed. As a result, Data signals emitted by Data transmission terminal and quantum probe signal are redistributed in different links through commutating devices 140. Redistribution rules are set by the controlling unit 130 controlling the commutating device 140. With this apparatus, any significant change in the quantum probe signal value is considered as an eavesdropping attempt, which will trigger an alarm 750.

Alarm 750 can be connected with different further procedural steps of a reaction on the detected eavesdropping as redirecting the flow of information to a different channel and/or to change the content of the information to be transmitted on said channel.

Figure 2B:
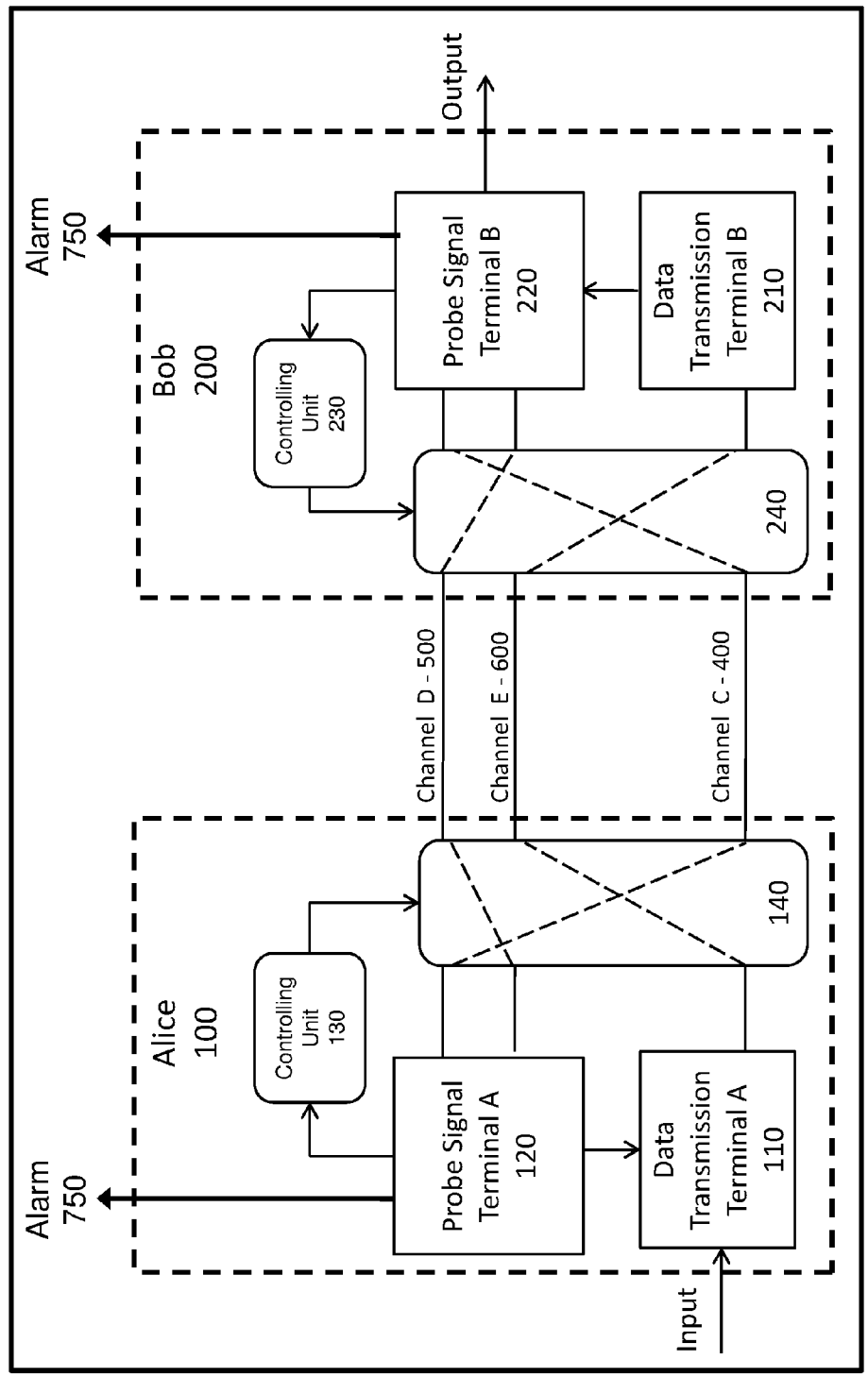
FIG. 2b is a schematic view of the general architecture of the system including the invention apparatus.

FIG. 2b represents the embodiment of the general apparatus of the invention in a communication system. A communication system is composed of an Emitter Alice 100 and Receiver Bob 200. Emitter and Receiver include at least one data signal transmission terminal 110, at least one quantum probe signal terminal, a commutating device 140 actuated with a controlling unit 130. The commutating device 140 of the emitter Alice 100 is connected to the commutating device 240 of the receiver Bob 200 by at least two channels: Channel C 400 and Channel D 500. Additionally, a specific Channel E 600 may be used for Terminal synchronization. The data signal transmission terminal 110 and probe signal terminal 120 are connected to the commutating device 140. The data signal transmission terminal 110 can include encryption/decryption capability for the data signal. As a result, an eavesdropper will not be able to predict which of the channels linking Alice 100 and Bob 200 carry the quantum probe signal. When performing an eavesdropping attempt, the eavesdropper will be forced to sometime also interact with the quantum probe signal. This will result in a significant change of quantum probe signal value so called QBER which will in turn trigger the alarm 750.

Figure 3:
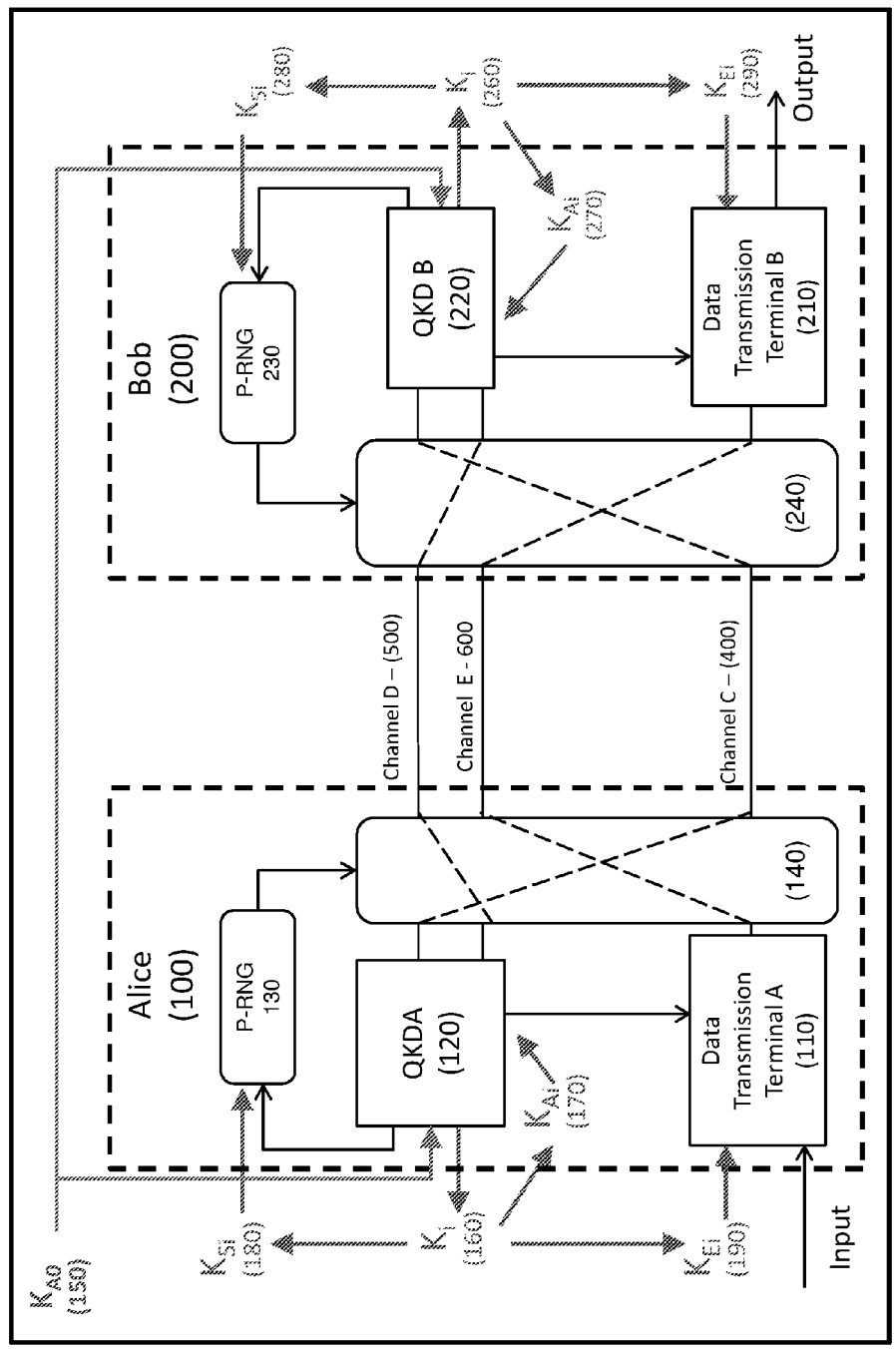
FIG. 3 represents a schematic description of a specific embodiment of the disclosed invention.

FIG. 3 describes a specific communication system exploiting disclosed invention based on QKD (compare to prior art shown in FIG. 1). Alice 100 is composed of at least four subsystems: the Data Transmission terminal A unit 110; the QKD apparatus 120 which is an apparatus able to generates quantum states and quantum probe signals; a random number generator 130 and a commutating device 140 which switch or inhibit data signal and quantum probe signal alternatively from a specific channel 400/500 to another. Bob 200 is composed of at least four subsystems: the Data Transmission terminal B unit 210; the QKD apparatus 220 which is an apparatus able to analyze/receive quantum states and quantum probe signals; a random number generator RNG 230 and a commutating device 240 which switch in the same way and according to commutating device 140 in order to keep channels 400 and 500 synchronized.

Random number generator 130 and 230 are in charge of realizing the randomness expansion, a process described below enabling to get commutating devices 140 and 240 synchronized.

In QKD, Alice 100 and Bob 200 first exchange quantum signals over the quantum channel 400 or 500 to generate raw key. Then, they agree on a shared secret key from the raw key by performing a joint post-processing of the raw key by communicating on the public channel. To be able to achieve authentication Alice and Bob pre-share a secret key $K_{A0}$ 150 that is long enough for authentication purposes in the initial QKD round. More precisely, this means that first Alice 100 and Bob 200 preshare a secret key $K_{A0}$ 150 long enough to authenticate messages exchanged during the initial QKD round. Then, after the quantum key transmission (or raw key generation) phase is completed, Alice sends its message MA along with its authentication tag TA=fk(MA), where fk can be for example an ε-ASU2 hash function identified by k, to Bob 200.

The messages contain for example settings used for encoding/decoding on the quantum channel. Upon receiving the message-tag pair (MA, TA), Bob 200 verifies the authenticity of MA by comparing TA with a tag that he generated for the received message using fk. If they are identical, then Bob can be certain, with high probability, that the message did originate from Alice 100; otherwise he rejects the message. If all goes well and a key is generated successfully in the initial QKD round, then Alice and Bob can reserve a portion of this newly generated key for authentication purposes in the next round $K_{Ai}$ 170. Therefore, in general, a portion of the key generated by QKD in the present round is used to authenticate messages in the subsequent round $K_{Ai}$ 170 and the other remaining portion is used for message encryption $K_{Ei}$ 190. For this reason QKD is more accurately called Quantum Key Growing (QKG). One of the main characteristic of this invention is to include in this Quantum Key Growing process a third set $K_{Si}$ 180 dedicated to define the commutation frequency. By having this $K_{Si}$ generated through the Quantum cryptography process, the apparatus ensures the synchronization of commutating devices 140, 240. Synchronization of the optical switches 140 and 240 is mandatory as data and quantum information take distinguished path. Therefore, one of the main aspect of this invention is to split a $K_i$ in three sets (KAi, KEi, KSi) each portion of the key used for Authentication, Encryption and Switching. Using the same seed provided by QKD systems 120, 220 ensures to generate same bits results at RNG 130, 230 which enables commutating device 140, 240 synchronization.

Alice 100 and Bob 200 exchange both Data and Quantum probe signals through Channels C and E00, 600. In this configuration, commutating device 140, 240 is between two physically separated media (e.g., fibers), commutation occurrence time is synchronized between commutating devices (140) (240), but unknown and unpredictable. FIG. 3 represents a QKD system adapted to switch randomly data (transmitted by 110) and quantum probe signals (generated by 120) on multiple fibers. QKD system includes two QKD stations, the first one considered as the emitter Alice 100, the second one Bob is the receiver 200.

Alice 100 and Bob 200 are carefully synchronized through the Quantum Key Growing process (explained in the previous paragraph) and linked through. The optical signal generated by QKD systems 120, 220 are used by RNG (random generator) 130, 140 to generate random bits. Sets of random bits define optical switch 140, 240 frequency to distribute randomly quantum data and encrypted data on Channel A 400 and Channel B 500.

In an embodiment not shown here, the commutating devices 140 and 240 can also encompass a third channel, so that all channels are changed at the synchronized moment in time. In further embodiments it is also possible to use further channels, either for further quantum probe signal transmission for fall back positions in case of denial of service, for example, attacks of key distribution or for data signal transmission.

FIG. 4*a*, FIG. 4*b* and FIG. 4*c* represent three detailed embodiments of the commutating device at the emitter 140 and at the receiver 240

FIG. 4*a* is describing a commutating device based 140 on Time Division Multiplexing approach.

In this case, the commutating device is at least composed of an actuator generating a trigger signal 141, a quantum probe signal channel 142, a Data signal channel 143 and a time multiplexer 144. The actuator generating the trigger signal 141 is linked to data 143 and quantum probe signal 142 terminals. Data and Quantum probe signal are both multiplexed on the same channel thanks to a time multiplexer 144.

The commutating device 140 is based in that case on an actuator used to generate a trigger signal 141 that inhibits alternatively data and quantum probe signals. More precisely when quantum probe signal 142 is inhibited, only Data Signal 143 is carried on Communication Channel 400 and reciprocally when Data Signal 143 is inhibited only Quantum probe signal 142 is carried on Communication Channel 400

Moreover during a period TD 145, Quantum probe signal 142 is inhibited whereas Data signal 143 is carried through Communication Channel 400. During a period TP 146, Data signal 143 is inhibited whereas Quantum probe signal 142 is carried through communication channel 140. With this configuration, Data signal 143 and Quantum probe signal 142 are randomly swapped on Data Channel 400 and this swapping system cannot be anticipated by any eavesdropper. Therefore Eavesdropping attempt may be detected and detected during TP 146

FIG. 4*b* describes a Commutating device based on Wavelength Multiplexing approach. The commutating device 140 is at least composed of an Actuator generating a trigger signal 141, a quantum probe signal channel 142, a data signal channel 143, two wavelength multiplexers 147 and an optical switch 148.

Quantum probe signal 142 is connected to a first wavelength multiplexer 147 thanks to two ports P1 and P2. P1 is used to carry a signal at λ1 wavelength and P2 is used to carry a signal at λ2 signal. Therefore Quantum probe signal wavelength λP may be generated by two light sources with two different wavelength values λ1 and λ2.

Data signal terminal 143 is connected to a second wavelength multiplexer 147' thanks to two ports P1 and P2. P1 is used to carry Data signal at λ1 wavelength and P2 is used to carry Data signal at λ2 wavelength. Therefore Data signal wavelength XD may be generated by two light sources with two different wavelength values λ1 and λ2.

Alternatively at each Data and Quantum probe signals terminal one light source may be used with a demultiplexer in order to generate a signal with two possible wavelength values λ1 and λ2. The two optical multiplexers 147 147' outputs are linked to an optical switch 148 which is able to switch from one output to the other. Optical multiplexers are used to combine data and quantum probe signal on the same communication channel.

In order to synchronize quantum probe signal wavelength, data signal wavelength and optical switch commutation, a trigger signal is used 141. Trigger signal 141 is generated at the emitter 100 by controlling unit 130 and at the receiver Bob 200 by its controlling unit 230. This trigger signal 141 is able to set data and quantum probe signals on 2 different wavelength (e.g: whether quantum probe signal takes λ1 and data signal λ2, or quantum probe signal takes λ2 and data signal λ1). This means that communication channel carries two potential signals whether: Quantum probe signal is at λ1 and Data signal is at λ2 or Quantum probe signal is at λ2 and Data signal at λ1. This Trigger signal 141 is set in a random way unknown by any eavesdropper. Therefore thanks to this embodiment Probe and Data signals wavelength are randomly swapped on the communication channel from λ1 to λ2 and from λ2 to λ1. By consequence, any eavesdropping attempt on λ1 may be detected during ΔT1 and on λ2 may be detected during ΔT2. This WDM embodiment is an additional embodiment option of the previously described invention.

FIG. 4*c* is describing a commutating device 140 based on data and quantum probe signals polarization. The commutating device is at least composed of an Actuator generating a trigger signal 141, a quantum probe signal channel 142, a data signal channel 143, two polarization rotators 149 and an optical multiplexer 144. Trigger signal 141 is generated at the emitter 100 by controlling unit 130 and at the receiver Bob 200 by its controlling unit 230. Quantum probe signal terminal 142 is linked to a polarization rotator device 149. Data signal terminal 143 is also linked to a polarization rotator device 149. Quantum probe signal channel and Data signal channels are multiplexed on the same communication channel thanks to a multiplexer 144.

The following explanation is based on Quantum probe signal polarization PP and Data signals polarization PD, each of them may take two values: P1 and P2. With (P1, P2) a pair of orthogonal polarization, each polarization rotator (on the data signal channel and quantum probe signal channel) enables to switch each signal polarization from P1 to P2 and P2 to P1. A trigger signal 141 is sent to these polarization rotators 149 in order to synchronize Data signal and Quantum probe signal polarization rotation. Probe and Data signals 142, 143 are then sent through the same channel thanks to a multiplexer 144. Trigger signals enables to randomly swap between time set 1 (where PP=P1 and PD=P2) 145" and time set 2 (where PP=P2 and PD=P1) 146" in a way that cannot be anticipated nor guessed. This polarization embodiment is an additional option for the previously described invention where any eavesdropping attempt may be detected.

Figure 5C:
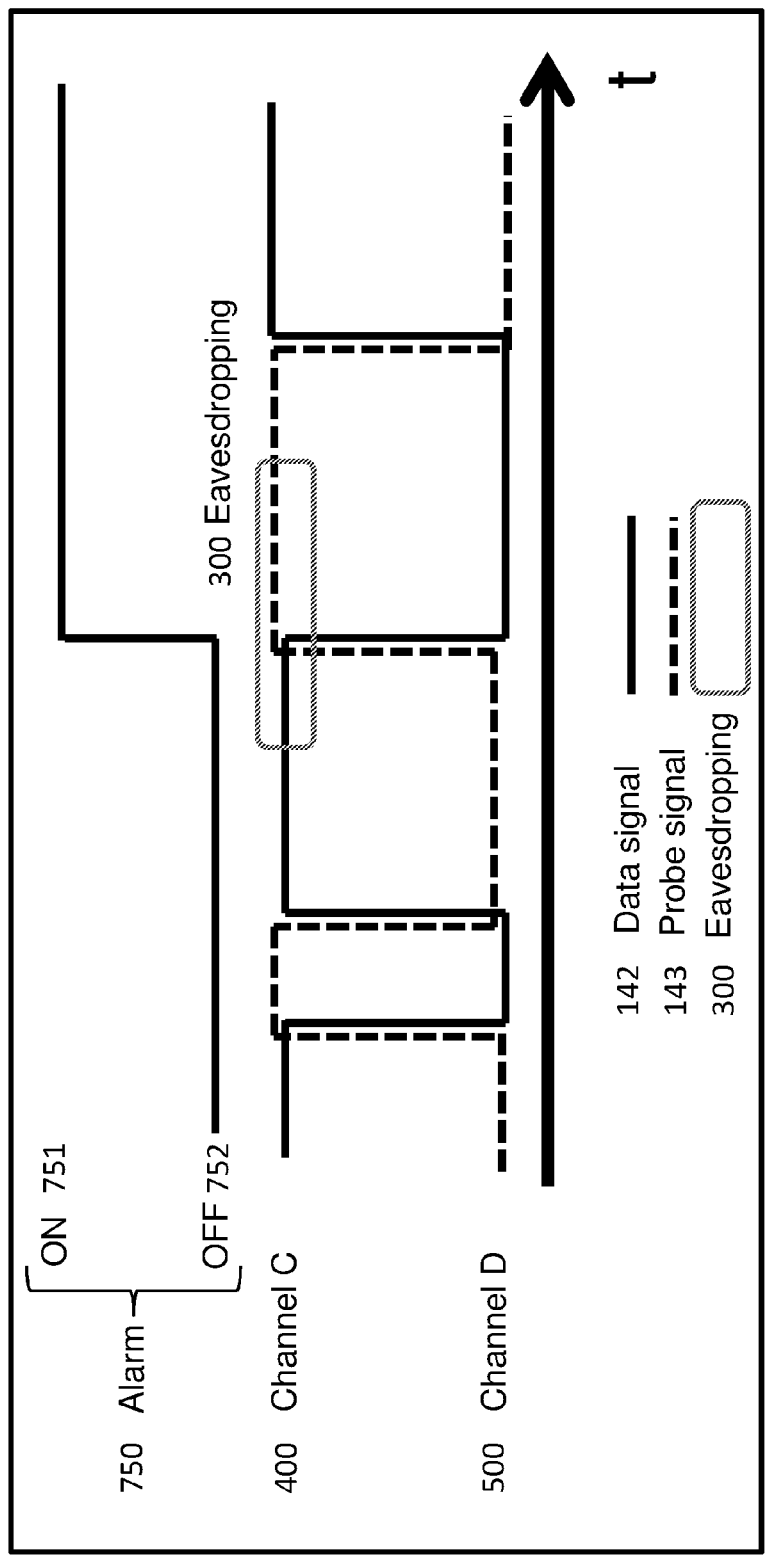
FIG. 5c shows a generic view of signals generated within an apparatus according to the invention and describes the method related to the invention, when eavesdropping is detected.

FIGS. 5*a*, 5*b* and 5*c* describe an example of commutating occurrences and method associated to the apparatus to detect eavesdropping attempt.

These figures describes how trigger signals 141 are randomly generated by controlling units 130, 230 in order to synchronize commutating devices 140, 240 previously described in FIGS. 4*a*, 4*b* and 4*c*. Commutation may happen at the end of each frame. A frame is a sequence of N bits (with N>1).

FIG. 5*a* describes a commutation occurrence that is set at random time set. Quantum Probe Signal Terminal is supposed to be working 700, generating sets of N random bits per frame 710 (where a frame is a set of a defined number of bits). As a general rule, Commutating Device 140 is actuated when a specific Frame A composed on N bit values is generated by the controlling unit 130 which corresponds to the Trigger Signal 141. As each of the N bits may take two values, "A" occurrence probability is 1/(2^N) to be generated by the Controlling Unit 130 and commutating frequency is set as 1/(2^N) occurrence 720. Therefore probe and signal data are randomly distributed between communication systems 730. A significant change in Quantum probe signal value signals an eavesdropping attempt detection. If an intrusion is detected by probe terminal 740 an ALARM is triggered 750 which generates at least one of several actions: an alarm notifies the end-user of the intrusion blocking of data signals transmission traffic rerouting on non-eavesdropped channels.

In FIG. 5b commutation occurrence is set at periodic time set with 50% probability. As a general rule, commutating device 140 is actuated depending on each N+1 bit value (at the end of each frame). As an example, after N bits frame a commutation occurs if and only if bits N+1 value is 1. In that event, a Trigger signal 141 is generated by the commutating device 140. In this case commutation probability at the end of each frame is 50% 720'. Therefore probe and signal data are randomly distributed between communication systems 730. If an intrusion is detected by probe terminal 740 an ALARM is triggered 750 which generates at least one of several actions: an alarm notifies the end-user of the intrusion blocking of data signals transmission traffic rerouting on non-eavesdropped channels.

These signals may be carried on two physically distinguished communication channel (e.g., optical fibers), or on the same physical channel (thanks to WDM, TDM or polarization combination techniques) Data and Quantum probe signals are alternatively and randomly swapped from channel 1 to channel 2. Suppose a channel is currently victim of an eavesdropping attempt. If the eavesdropping 300 attempt happens when quantum probe signal is carried on the eavesdropped communication channel, an eavesdropping 300 attempt may be detected. If eavesdropping is detected, it triggers an ALARM signal which is turned ON. If eavesdropping is detected, at least one of several actions can be performed by the system: an alarm notifies the end-user of the intrusion which in consequence may block data signals transmission or induce traffic rerouting on non-eavesdropped channels.

The specification incorporates by reference the disclosure of EP 15 167 392.8, filed May 12, 2015.

The present invention is, of course, in no way restricted to the specific disclosure of the specification and drawings, but also encompasses any modifications within the scope of the appended claims.

LIST OF REFERENCE SIGNS

| | |
|---|---|
| 100 | Emitter Alice |
| 110 | Data Transmission Terminal A |
| 120 | Quantum probe signal Terminal A |
| 130 | Controlling Unit |
| 140 | Commutating Device |
| 141 | Trigger Signal |
| 142 | Quantum probe signal |
| 143 | Data Signal Channel |
| 144 | Multiplexer |
| 145 | ΔTD |
| 146 | ΔTP |
| 145' | ΔT1 |
| 146' | ΔT2 |
| 145" | ΔT1 |
| 146" | ΔT2 |
| 147 | Wavelength Multiplexer |
| 150 | secret key $K_{A0}$ |
| 160 | $K_i$ |
| 170 | $K_{Ai}$ |
| 180 | $K_{Si}$ |
| 190 | $K_{Ei}$ |
| 200 | Receiver Bob |
| 210 | Data Transmission Terminal B |
| 220 | Quantum probe signal Terminal B |
| 230 | Controlling Unit |
| 240 | Commutating device |
| 260 | $K_i$ |
| 270 | $K_{Ai}$ |
| 280 | $K_{Si}$ |
| 290 | $K_{Ei}$ |
| 300 | Eve (eavesdropper) |
| 400 | Fiber/Channel C |
| 500 | Fiber/Channel D |
| 600 | Fiber/Channel E |
| 700 | Quantum probe signal terminal system active |
| 710 | N random generated bits |
| 720 | commutating device |
| 730 | encrypted random distribution |
| 740 | Intrusion detection |
| 750 | Alarm |
| 751 | Alarm switched ON |
| 752 | Alarm switched OFF |

We claim:

1. A system for providing eavesdropping detection of an optic fiber communication between two users, comprising:
   a transmitter station for each user; and
   at least two communication channels between the transmitter stations,
   wherein each transmitter station having:
      a quantum probe signal terminal for exchanging quantum probe signals on the communication channels, and
      a data transmission terminal for exchanging data signals on the communication channels,
      a commutating device configured to commutate the use of channels for data and quantum probe signals,
      wherein the quantum probe signal terminals are configured to exchange quantum probe signals on a first of the two channels,
      wherein the quantum probe signal terminals are configured to extract a key from the quantum probe signals for authentication,
      wherein the data transmission terminals are configured to exchange data signals on the second of the two channels,
      wherein the quantum probe signal terminals are configured to use a first portion of the key generated by the quantum probe signal terminals to authenticate the data transmission terminals for the data signals and to dedicate a second portion of the key to define commutation occurrences of commutating devices.

2. The system according to claim 1, wherein the commutating devices distribute and combine probe and data with wavelength, time or polarization multiplexing techniques.

3. The system according to claim 1, wherein the data transmission terminals are configured to use another portion of the extracted key to encrypt and decrypt the messages within the data signals.

4. The system according to claim 1, wherein the controlling unit comprises a random number generator and a quantum probe signal terminal.

5. The system according to claim 1, wherein the quantum probe signal terminals are quantum key distributors.

6. The system according to claim 1, wherein the commutating devices are optical switches.

7. A method for providing eavesdropping detection of an optic fiber communication between two users, comprising the steps of:
exchanging both data signals and quantum probe signals randomly through at least two or three channels between the users as follows, exchanging quantum probe signals between a quantum probe signal terminal provided with one user and another quantum probe signal terminal provided with the other user on one of the channels, exchanging data signals between a data transmission terminal provided with one user and a data transmission terminal provided with the other user on another channel, wherein the quantum probe signal distribution can be monitored for detecting eavesdropping, wherein a portion of the key generated by the quantum probe signal terminals is dedicated to define commutation occurrences of commutating devices configured to commutate the use of the channels for data and quantum probe signals.

8. The method according to claim 7, wherein another portion of the extracted key is used to encrypt the messages within the data signals.

9. The method according to claim 7, wherein another portion of the extracted key is used to authenticate the data transmission terminals units for the data signals.

10. The method according to claim 7, wherein the different channels are realized through separation of the data and quantum probe signals from the group comprising use of different optical fibers, use of one or more optical fibers with transmission at different wavelengths or at different polarizations or with time-division.

11. The method according to claim 7, wherein the quantum probe signal terminals are working as quantum key distributors.

12. The method according to claim 7, wherein the commutation encompasses at least the current quantum probe signal channel and optionally further channels.

13. The method according to claim 7, wherein the next commutation occurrence for the commutating devices is predetermined through random generation.

* * * * *